US006487426B1

(12) United States Patent
Haber

(10) Patent No.: US 6,487,426 B1
(45) Date of Patent: Nov. 26, 2002

(54) SELF-ALIGNING WIRELESS INTERFACE SYSTEM AND METHOD

(75) Inventor: William J. Haber, Tempe, AZ (US)

(73) Assignee: Motorola, Schaumburg, IL (US)

(*) Notice: Subject to any disclaimer, the term of this patent is extended or adjusted under 35 U.S.C. 154(b) by 0 days.

(21) Appl. No.: 09/465,136

(22) Filed: Dec. 16, 1999

(51) Int. Cl.$^7$ ................................................ H04B 1/38
(52) U.S. Cl. ...................... 455/575; 455/426; 455/466; 455/11.1
(58) Field of Search ............................... 455/575, 550, 455/90, 426, 12.1, 25, 501, 562, 656, 657, 466, 11.1; 342/359

(56) References Cited

U.S. PATENT DOCUMENTS

| 5,347,286 A | | 9/1994 | Babitch | |
|---|---|---|---|---|
| 5,481,561 A | | 1/1996 | Fang | |
| 5,583,514 A | | 12/1996 | Fulop | |
| 5,726,661 A | * | 3/1998 | Fuji | 342/359 |
| 5,835,057 A | * | 11/1998 | Van Heyningen | 342/359 |
| 6,016,120 A | * | 1/2000 | McNabb et al. | 342/357.06 |
| 6,023,242 A | * | 2/2000 | Dixon | 342/359 |
| 6,208,296 B1 | * | 3/2001 | Saib | 342/422 |
| 6,278,405 B1 | * | 8/2001 | Ha et al. | 342/359 |

FOREIGN PATENT DOCUMENTS

| EP | 0 570 325 A1 | 5/1993 |
|---|---|---|
| FR | 2 771 250 A1 | 11/1997 |
| GB | 2 327 566 A | 1/1999 |
| WO | PCT/US00/33666 | 12/2000 |

* cited by examiner

Primary Examiner—Edward F. Urban
Assistant Examiner—Charles Craver
(74) Attorney, Agent, or Firm—Ingrassia Fisher & Lorenz

(57) ABSTRACT

A self-aligning wireless interface system (1) couples a wide variety of equipment (12, 18, 20, 40, FIG. 1; 84, 90, FIG. 2) to one or more of a wide variety of communications, entertainment, Internet, security, control, and/or other wireless services. The system (1) can also provide a wireless interconnection among such equipment. The system (1) can include an antenna system (4), geo-location module (8), communications module (10), orientation module (22), solar cell array (24), and rechargeable battery (26). The system (1) provides a wireless link to satellite (30), airborne (36), and/or terrestrial (38) transceivers, and optionally a wireless link connecting user equipment. To facilitate installation, the system (1) can be deployed by a person possessing minimal or no technical qualifications, and it can power itself up into a fully operational state. The system (1) optionally comprises a self-contained power system, which can include a solar cell array (24).

18 Claims, 4 Drawing Sheets

SELF-ALIGNING WIRELESS INTERFACE SYSTEM AND METHOD

RELATED INVENTION

The present invention is related to the invention described in U.S. patent application Ser. No. 09/464,918, filed on even date herewith, assigned to the same assignee, and titled "Method and Apparatus for Wireless Interface to a Wireless Service and Between On-Site Equipment".

FIELD OF THE INVENTION

This invention relates generally to wireless interfaces and, in particular, to a method and apparatus for providing a self-aligning wireless interface system to enable various types of equipment to communicate with at least one wireless service and/or with each other.

BACKGROUND OF THE INVENTION

A wide variety of wireless services are currently provided to subscribers. Examples of such wireless services include communications, such as telecommunications, including telephone and facsimile; broadband communications; entertainment, such as television, radio, recorded music, movies, and computer-based games; the Internet and its associated electronic commerce, education, entertainment, communications, information, government, and other functions; security systems for business and the home; and building control systems for business and the home, such as lighting control, temperature control, process and industrial control, and a myriad of other monitoring and control functions.

At present, when coupling equipment, including subscriber equipment, to wireless services, it is typical to provide an on-site antenna system in the vicinity of the equipment that must be connected to a local power source by a skilled technician. The necessity of providing a wire or cable connection to a local power source adds considerable expense and time to the task of installing antenna systems, thus erecting a considerable entry barrier to installation ease and cost. In addition, after the system has been installed and the system is subsequently moved or relocated, it is necessary to re-cable or re-wire the connections between the equipment and the antenna system, resulting in additional expense and time. Therefore, as may be appreciated, there is a significant need for an interface system between wireless services and equipment which does not require a hard-wired connection to the user equipment, and which does not require the interface system to be connected to a local power source.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF THE DRAWINGS

In the following detailed Description of the Drawings, method and apparatus are provided for performing the operations generally necessary to get a system functioning as it is intended to function (i.e., alignment). More particularly, method and apparatus are provided for implementing a self-aligning interface between a wireless service and equipment communicating with the wireless service, including, but not limited to subscriber equipment such as a radio-frequency (RF) device (e.g., wireless computers, cellular telephones, pagers, and the like).

Figure 1:
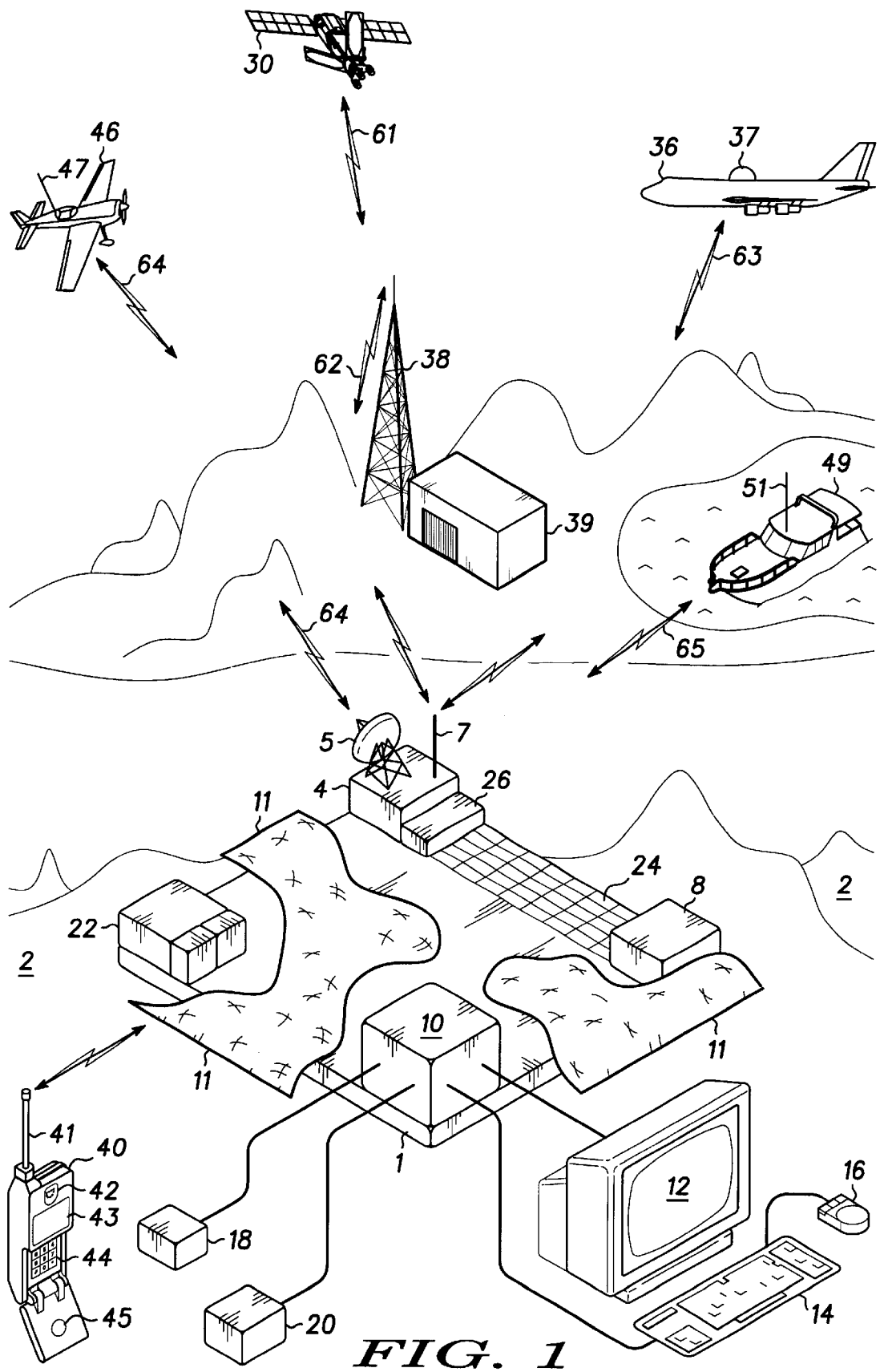
FIG. 1 depicts a self-aligning wireless interface system as deployed in an outdoor context.

Referring to FIG. 1, a self-aligning wireless interface system is depicted according to an exemplary embodiment of the present invention. FIG. 1 shows a site 2 where it is desirable to receive one or more wireless services. Without limitation, site 2 can be a construction site, industrial site, military site, government site, religious site, educational site, recreational or sports site, oil rig or mining site, agricultural site, scientific research site, or any other type of outdoor site where wireless service is desired to be received. For example, site 2 could be a bio-hazard area into which interface system 1 is deployed by air-drop, by robotic means, or in any other suitable manner, and which someone desires to measure various local parameters and to communicate the measurements to a remote observer.

In one embodiment, an interface system 1 is shown as deployed by a person having minimal technical skills, and without any particularly optimal orientation on the ground or any other suitable platform or support. Alternatively, interface system 1 can be deployed by dropping it from a vehicle such as a plane, boat, or land vehicle, or it can be deployed in any other suitable manner.

In one embodiment, interface system 1 is enveloped in a stealth cloak or protective cover 11 when it is initially deployed. Cover 11 can be camouflaged appropriately, so that interface system 1 cannot readily be detected. Cover 11 can also serve to protect interface system 1 from the elements for a period of time or to cushion interface system 1 in the event of a drop or other rough deployment. If cover 11 is sufficiently transparent to wireless signals and to sunlight (in an embodiment that uses a solar cell array 24 to recharge a battery 26), or if an embodiment uses a fully charged battery 26 (either with or without a solar cell array 24), interface system 1 is immediately usable.

Cover 11 can be optionally formed of shreddable or biodegradable material that decomposes after being subjected to one or more environmental elements, such as sunlight, rain, extreme temperatures, wind, waves, and so forth, so that interface system 1 becomes usable only when a sufficient portion of cover 11 has degraded and been removed by action of the elements. The decomposition speed of cover 11 can be selected for a specific application in which the interface system 1 is being used, so that for one application it can be accelerated and for another it can be prolonged. It will be apparent that cover 11 can also be removed by a person or by a powered mechanism.

Interface system 1 comprises an antenna system 4, which includes a fixed or steerable antenna 5 and an omni-directional antenna 7. Fixed or steerable antenna 5 communicates with remote antennas on remote communications nodes. For example, fixed or steerable antenna 5 communicates with satellite 30 over RF signal 61, with airplane 36 having a remote antenna 37 via RF signal 63, with terrestrial communications building 39 having a remote antenna 38 via wireless signal 62, with remote programmable device (RPD) 46 in the form of a remotely controllable airplane having remote antenna 47 via RF signal 64, and with boat or submarine 49 having remote antenna 51 via signal 65.

RPD 46, as shown, includes remote sensor equipment such as an optical sensor for observing objects on the surface of the earth such as boat 49, which could be part of a fishing fleet, naval fleet, commercial shipping fleet, or the like. Alternatively, other types of sensors could be employed, such as an earthquake monitor, listening device, rain gauge, or any other type appropriate to the particular mission. While RPD 46 is depicted in FIG. 1 as an airplane, it could obviously be a boat, ground vehicle, or any other type of remote programmable device that either moves around or remains at a fixed location.

Omni-directional antenna 7 can also communicate with remote antennas, provided that they are not too distant, and it also communicates with equipment which is relatively nearby, such as wireless device 40, which can be a cellular telephone, two-way radio, hand-held computer, or the like. Wireless device 40 communicates via RF signals, optical signals, or any other type of wireless signals.

Interface system 1 also includes a geolocation module 8 which can include global positioning system (GPS) equipment which determines the geolocation of interface system 1 from a position-determining network, such as a GPS satellite constellation. Alternatively, the geolocation of the interface system 1 can be pre-programmed, if the site location where the interface system 1 is to be delivered is known with a sufficient degree of accuracy. Geolocation module 8 can also derive a suitable time base, including an accurate time signal, from GPS signals received from the GPS satellites. Alternatively, the time can be pre-programmed into the interface system 1.

In addition, interface system 1 includes an orientation module 22, which can include any type of appropriate equipment for determining the physical attitude or orientation of interface system 1. In one embodiment, orientation module 22 includes a tilt indicator 13 and a compass 15. Tilt indicator 13 is used to determine the degree in which interface system 1 is tilted with respect to a point of reference, such as a horizontal plane, a vertical line, or the like, while compass 15 is used to determine the degree to which a reference point on interface system 1 is offset with respect to a set of north/south or east/west coordinates. Alternatively, if the person delivering the interface system 1 to the intended site can be relied upon to orient it with respect to north/south or east/west coordinates, and to level it, within acceptable tolerances, the orientation module 22 may be removed.

Interface system 1 also comprises a power source, which in one embodiment includes a solar cell array 24 and a rechargeable battery 26, which provides electric power to the interface system 1. In other embodiments, depending upon the particular application, the power source could be a non-rechargeable battery, a solar cell array without a battery, a nuclear generator, or any other suitable source of electric power. In addition, interface system 1 includes a communications module 10, which is operationally coupled to the other components of interface system 1.

Communications module 10, which serves as the control and communications center of interface system 1, will be described in greater detail regarding FIG. 2. Coupled to communications module 10 are a computer monitor 12, computer interface equipment, such as keyboard 14 and pointing device 16, one or more sensors 18 for determining conditions at site 2, and one or more actuators 20 for controlling any type of equipment or components (not shown) at site 2.

In the relatively near vicinity of site 2 is wireless device 40, which can be a cellular telephone, two-way radio, hand-held computer, or the like. Wireless device 40 typically includes features such as keypad 44, microphone 45, viewing screen 43, speaker 42, and antenna 41; however, wireless device 40 can obviously include more or fewer features than those just mentioned, depending upon the particular type of wireless device.

Figure 2:
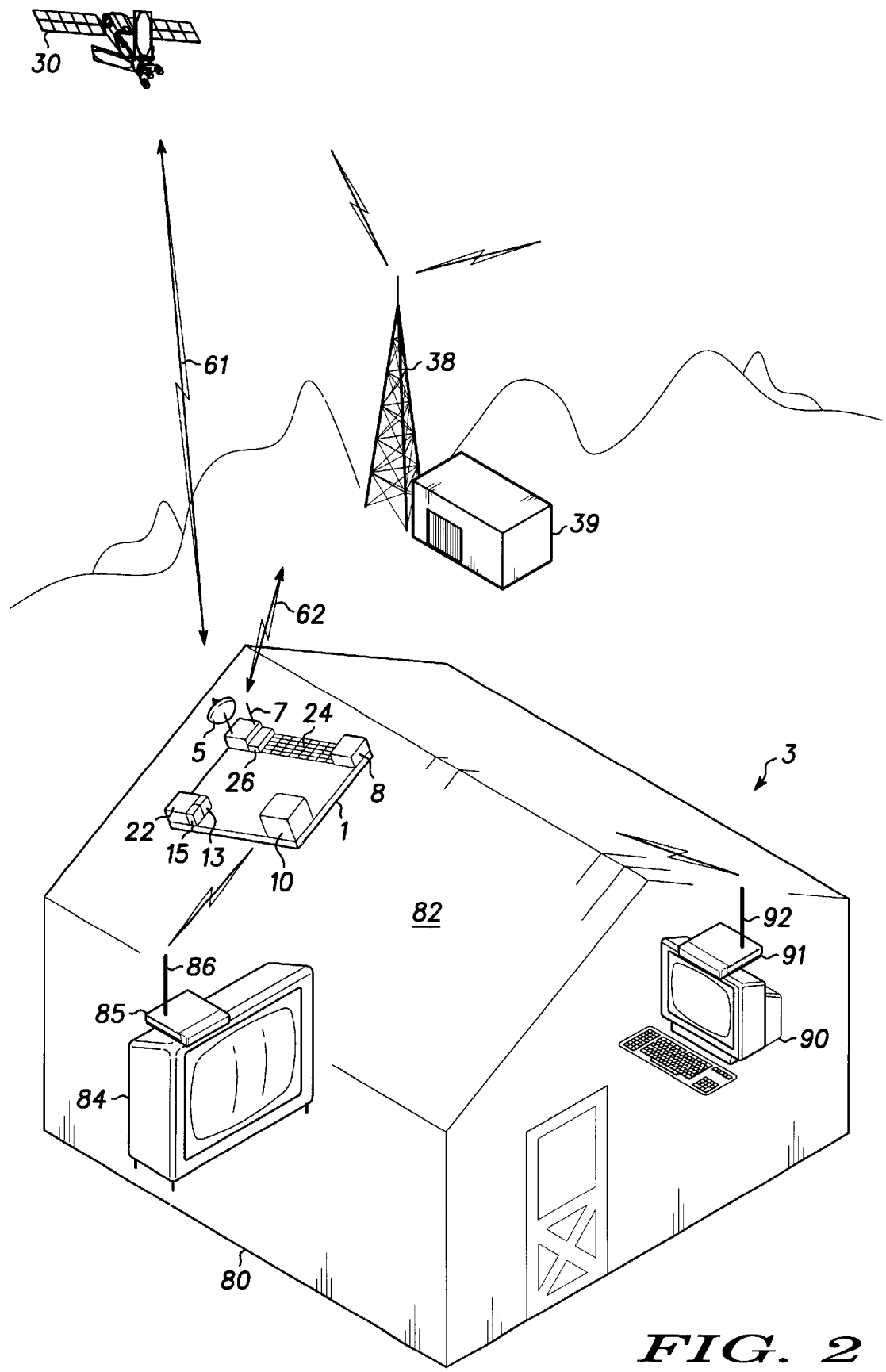
FIG. 2 depicts a self-aligning wireless interface system as deployed in an indoor context.

FIG. 2 depicts a self-aligning wireless interface system as deployed in an indoor context. Without limitation, site 3 can be a home, office, school, store, government or military facility, place of worship, airport terminal, automobile, motor home, train, airplane, bus, or any other type of building or vehicle or site where wireless service is desired to be received indoors or near indoors.

In one embodiment, as depicted in FIG. 2, site 3 is a house 80 or other type of residence. Various wireless signals are shown, including radio frequency (RF) signal 61 to/from satellite 30 and RF signal 62 to/from terrestrial antenna 38. However, any other type of wireless signals, such as optical signals, can be employed with the invention, and any other type of remote communications node can be employed, such as a boat, airplane, land vehicle, or person. In the embodiment depicted in FIG. 2 interface system 1 is shown mounted on the roof 82, although it could be mounted at any other appropriate location at or near the site 3, such as on a self-standing antenna or on the ground.

Wireless interface system 1 comprises a suitable antenna, such as omni-directional antenna 7, for communicating with various equipment interface(s) 85 and 91 that are located in, on, or near the site 3. TV interface 85 includes antenna 86, and computer interface 91 includes antenna 92.

As described more fully in the Related Invention identified above, which is hereby incorporated by reference, wireless interface system 1 provides a wireless communications link between a remote communications node, such as satellite 30 or terrestrial antenna 38, which provide access to a wireless service, and various equipment, such as television 84 and computer 90.

Communications with wireless services can utilize any or all of the on-site antenna types (5, 7), depending upon the requirements of the particular installation. Other suitable antenna types can also be utilized, such as make-before-break dual antennas for communicating with low-earth-orbit (LEO) satellites.

Multiple types of wireless links between wireless interface system 1 and wireless services can be employed simultaneously, such as direct broadcast satellite (DBS) television communications, satellite telecommunications, satellite broadband communications, and terrestrial radio frequency (RF) and/or optical communications, such as local multipoint distribution service (LMDS), "last mile" RF or optical distribution, and/or any other type of wireless link.

Likewise, a variety of wireless links between wireless interface system 1 and the on-site equipment interfaces, and between the on-site equipment interfaces and on-site equipment, could be utilized simultaneously, such as radio frequency and/or optical links.

According to one embodiment of the invention, every item of on-site equipment, such as television 84 and computer 90, can communicate with an appropriate wireless service by a wireless connection to wireless interface system 1.

According to another embodiment of the invention, one or more items of on-site equipment, including subscriber equipment, can wirelessly communicate with one or more other items of on-site equipment through wireless interface system 1. For example, computer 90 can wirelessly communicate with television 84 by a communications link comprising computer interface 91, antenna 92, antenna 7, and communications module 10. The link from communications module 10 comprises antenna 7, antenna 86, television interface 85, and television 84.

All of the on-site equipment that can communicate wirelessly with the wireless services can also communicate wirelessly with each other through communications module 10 of wireless interface system 1 using means that can be readily be implemented by one of ordinary skill in the art.

Interface system 1 can be delivered to site 3, in or near the subscriber equipment, by an unskilled person, including the intended user. This can entail nothing more complicated than placing the interface system 1 on the roof of the building in view of a remote communications node, such as satellite 30 or terrestrial antenna 38, but without further alignment. The delivery person then lets the wireless interface system 1 set itself up to enable the subscriber equipment to wireless communicate with the wireless service through the wireless interface system 1.

There is no necessity of stringing cables, conduits, and/or wires through building roofs, walls, attics, ceilings, flooring, and the like between the wireless interface system 1 and the on-site equipment. This results in a significant ease of installation, as well as ease of relocation within the site, of equipment which communicates with a wireless service, or with each other, resulting in significant savings in time and in the cost of installation and/or equipment relocation. This in turn increases the potential for greater market acceptance and market share of products and services that utilize the invention.

In addition, wireless interface system 1 is provided with a self-contained electrical power generating source, such as a solar cell array 24 and rechargeable battery 26, so that wireless interface system 1 need not be wired into an on-site power source, e.g. via electrical cabling, but rather it can be installed at the site 3 without the need to wire or cable it to anything at the site 3. The installer simply activates the power source, which is part of the wireless interface system 1, and it provides electric power to the wireless interface system 1. Alternatively, the power source can be activated by a timer or by an event, such as sunlight falling on the solar cell array 24.

Figure 3:
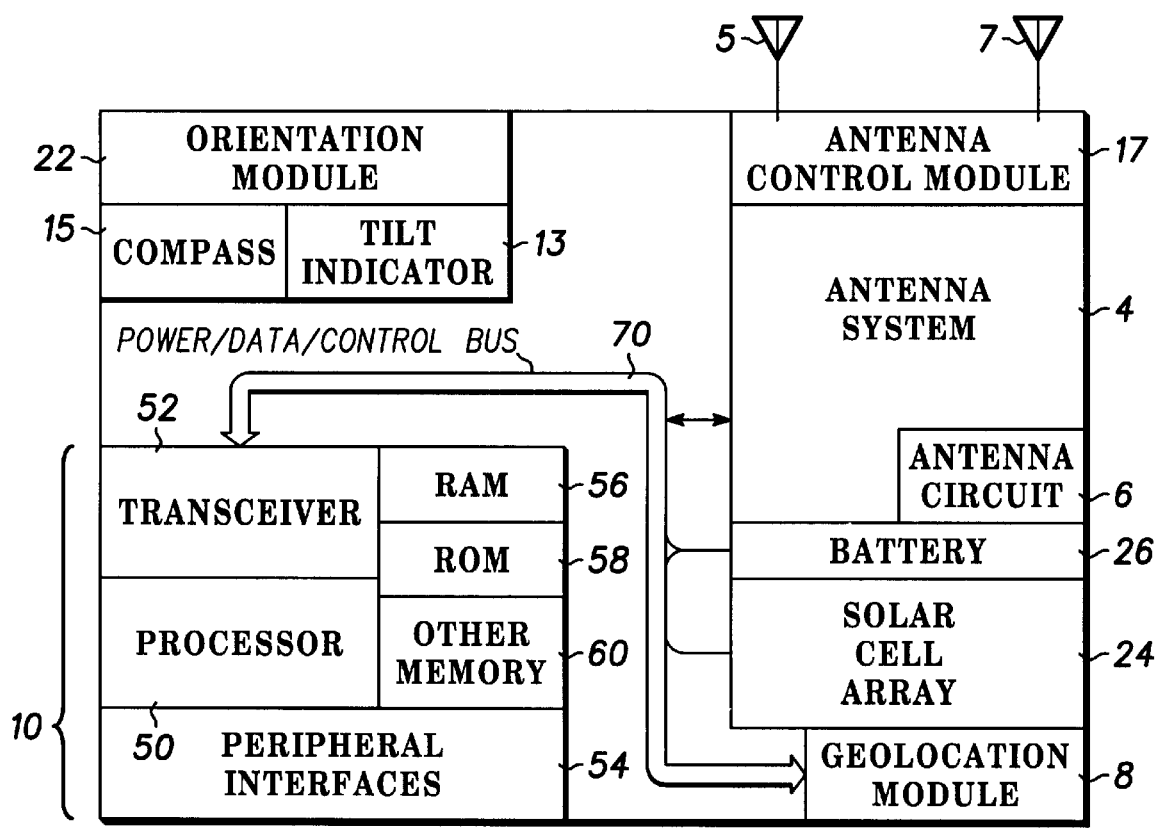
FIG. 3 depicts a simplified block diagram of a self-aligning wireless interface system, according to one embodiment of the invention.

FIG. 3 depicts a simplified block diagram of a self-aligning wireless interface system 1, according to one embodiment of the invention. As shown in FIG. 3, the wireless interface system 1 comprises an antenna system 4, which includes a fixed or steerable antenna 5, an omni-directional antenna 7, and an antenna circuit 6 which can include signal amplifiers (not shown). Antenna system 4 also includes an antenna control module 11 for controlling and/or steering antennas 5 and 7.

Interface system 1 also comprises a geolocation module 8, whose function was described earlier. Interface system 1 also comprises an orientation module 22, which further comprises a tilt indicator 13 and a compass 15, whose functions were also described earlier.

In one embodiment, solar cell array 24 and rechargeable battery 26 provide a source of electric power to interface system 1. In other embodiments, depending upon the particular application, the power source could be a wired connection to an on-site or near-site source of electrical power, a non-rechargeable battery, a solar cell array without a battery, or any other suitable power source. If required to be self-contained, the power source could alternatively be a wind-powered, water-powered, human-powered, animal-powered, geo-thermal-powered, chemical-powered, or nuclear-powered generator, or any other power source, which does not require a connection to an on-site electrical power supply. It may also be placed near power lines and use inductive coupling to receive power.

Wireless interface system 1 also comprises communications module 10. Communications module 10 includes transceiver 52 for transmitting and receiving communications among the various communications nodes shown in FIGS. 1 and 2. Communications module 10 also includes a processor 50 and associated memory in the form of random access memory (RAM) 56, read only memory (ROM) 58, and other memory 60 such as a hard disk, floppy disk, and or any other appropriate type of memory. Communications module 10 also comprises peripheral interfaces 54 which functionally couple communications module 10 to other associated equipment, such as computer monitor 12, keyboard 14, pointing device 16, sensor 18, and/or actuator 20 (illustrated in FIG. 1).

The various components and systems shown in the block diagram of the interface system 1 depicted in FIG. 3 are coupled to a power/data/control bus 70. Power/data/control bus 70 couples the various components and systems together, as required, so that electrical power is applied to all of them, and so that they perform their respective functions.

Processor 50 can initiate and perform self-alignment functions and communications functions, using the equipment of interface system 1, in accordance with suitable computer programs written by those of ordinary skill in the art and stored in RAM 56, ROM 58, and/or other memory 60.

Figure 4:
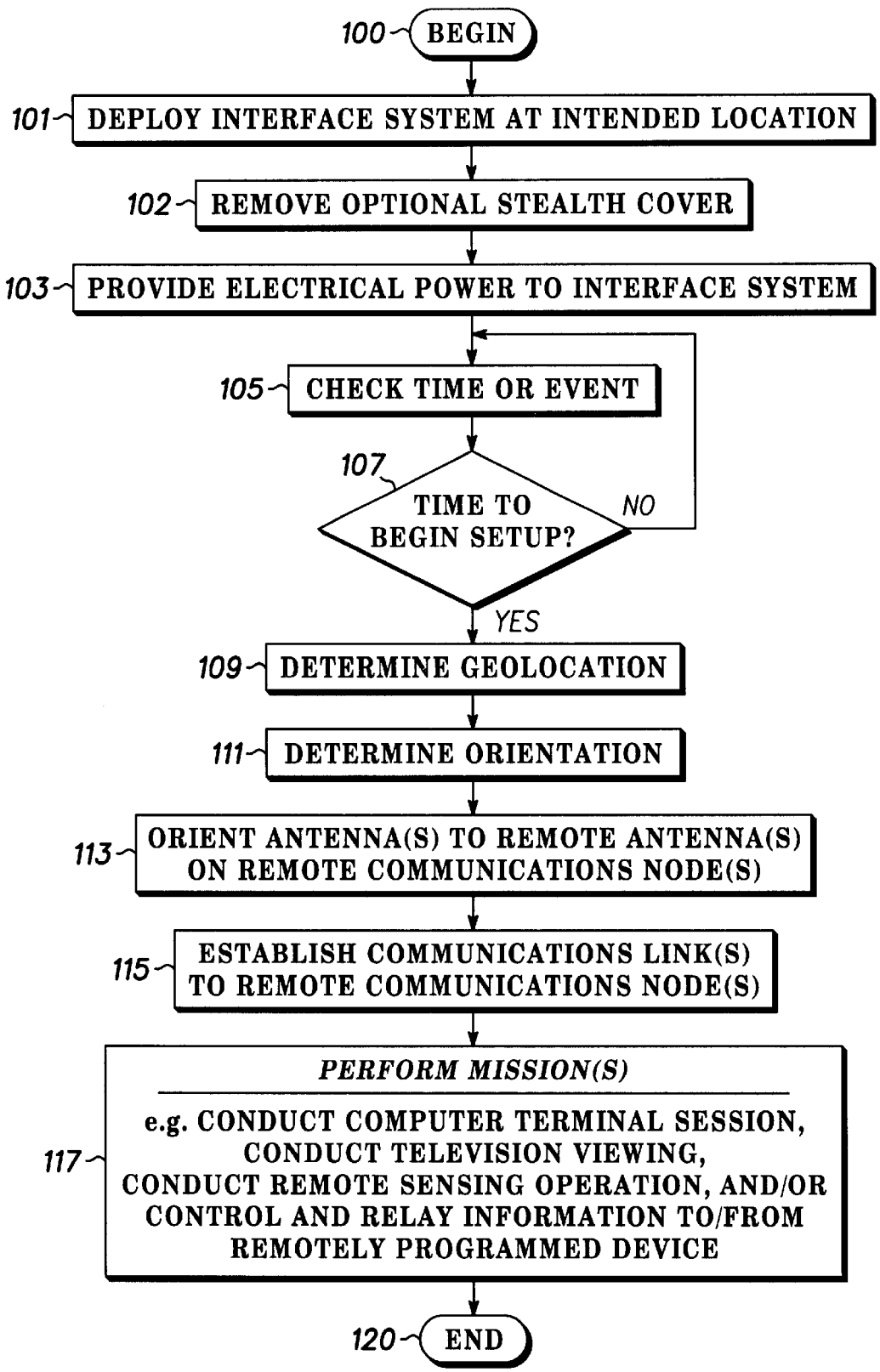
FIG. 4 shows a flow chart of a method of operating a self-aligning wireless interface system, according to one embodiment of the invention.

FIG. 4 shows a flow chart of a method of operating a self-aligning wireless interface system, according to one embodiment of the invention.

The method begins in block 100.

In block 101, a wireless interface system 1 is deployed at the intended location by a person having little or no technical ability. Alternatively, interface system 1 can be delivered by any other suitable means, such as air-drop, missile-launch, robotic means, or delivery from any other suitable kind of vehicle or deployment mechanism.

A wide latitude in the degree of tilt from a vertical reference, and in the orientation relative to north/south or east/west coordinates, is tolerable. One requirement is that at least the fixed or steerable antenna 5 be within visual sight of a desired remote antenna. If antenna 5 is a fixed antenna, the installer should align antenna 5 with an intended remote, fixed antenna. However, if antenna 5 is steerable, it need not be aligned by the installer, because its antenna control module 11 can locate and track a moveable remote antenna on a remote communications node, or locate a fixed remote antenna on a remote communications node.

In block 102, the stealth cover 11 (if this option is used) is removed, whether by a person, by a powered removal mechanism, or by the action of environmental elements, such as sunlight, rain, extreme temperatures, wind, waves, and so forth. Alternatively, as mentioned earlier, interface system 1 can be used immediately, without waiting for cover 11 to be removed, if solar cell array 24 is not immediately required to recharge battery 26, or if cover 11 is sufficiently transparent to allow adequate ambient light to fall on solar cell array.

In block 103, electrical power is provided to the interface system 1, e.g., in one embodiment via rechargeable battery 26, which is recharged via solar cell array 24. As mentioned above, many other power supply options are possible.

In block 105, the interface system 1 checks for whether a particular time or event has occurred which indicates that it is time to begin a set-up operation. The time, for example, could be set by the installer to a predetermined number of hours after delivery of the interface system 1 to its deployment site. An event could be when the power supply attains a predetermined voltage level after solar charging, or the occurrence of a particular environmental condition, or the user turning on a switch, or removal of the stealth cover 11.

In decision block 107, if the setup time has been reached, the method proceeds to block 109 but, if not, it returns to block 105.

In block 109, the interface system 1 determines its geolocation, utilizing the geolocation module 8 as described above.

In block 111, the interface system 1 determines its orientation, utilizing the orientation module 22 as described above.

In block 113 the interface system 1 orients one or more steerable antennas, such as fixed or steerable antenna 5, to one or more corresponding remote antennas on remote communications nodes, such as an antenna on satellite 30 or airplane 36, or terrestrial antenna 38.

In orienting a steerable antenna on interface system 1 towards a fixed remote antenna, the communications module 10 can utilize a database of locations of fixed remote communications nodes in conjunction with an algorithm for pointing the antenna towards the most suitable remote antenna, taking into account the position and orientation of interface system 1. The particular algorithm can be provided by one of ordinary skill in the art.

For remote communications nodes that are not fixed, such as an airplane or low earth orbit (LEO) satellite, the database comprises time information, so that a sufficiently precise position can be determined for a given time. In the case of LEO satellites, suitable ephemeris tables can be utilized. In the case of an aeronautical communications node, a predetermined flight path can be utilized. By using the information in the database, the position and orientation of the interface system 1, the precise time of day, and a suitable algorithm that can be provided by one of ordinary skill, antenna 5 of interface system 1 can be pointed towards and track, if desired, a remote moving antenna.

In block 115, the interface system 1 establishes one or more communications links to remote communications nodes, such as satellite 30 or terrestrial antenna 38.

In one embodiment, interface system 1 performs all of the operations described in blocks 103 through 115 automatically without human intervention.

In block 117, the interface system 1 has been completely set up and aligned, and it is ready to begin its operational mission, such as supporting a computer terminal session using computer keyboard and computer display monitor 12 at outdoor site 2 (FIG. 1), or using computer 90 at indoor site 3 (FIG. 2). Alternatively, the operational mission could comprise television viewing using television 84 at indoor site 3 (FIG. 2).

Other alternative missions could include a data collection or remote sensing operation using, for example, one or more sensors 18 at outdoor site 2 (FIG. 1). Alternatively, the mission could include controlling RPD 46, which can have a remote optical or other type of sensor, and relaying control information to and sensor information from the RPD 46, for example using hand-held wireless device 40.

In block 120 the process ends; however, it will be understood that once block 117 is reached, the mission operations of interface system 1 normally continue until interface system 1 is switched off, temporarily or permanently, or until interface system 1 is no longer functional.

It will be understood by those skilled in the art that the interface system could optionally perform any desired subset of the operations of the methods shown and described herein without departing from the intent and spirit of the invention. For example, operations 109 and 111 could be omitted, if the interface system 1 is reasonably positioned with respect to one or more compass points and reasonably leveled with respect to vertical.

It will also be understood by those skilled in the art that the operations of the methods shown and described herein can be carried out in a different order than those described with reference to FIG. 4.

Thus there have been described above apparatus and methods for providing a self-aligning wireless interface system which enables a wireless interface between various types of wireless services and various types of equipment, and between one or more units of equipment, which can be deployed by a person possessing minimal or no technical qualifications, which can power itself up into a fully operational state, and which does not need to be connected to a local power source.

The apparatus and methods described herein are effective, for example as part of a commercial business, in rapidly and easily deploying equipment, including subscriber equipment, and in coupling such equipment to a wireless service, or to each other through a central wireless hub (implemented, for example, in one embodiment by communications module 10 of wireless interface system 1) by avoiding the need to have a technically skilled person deploy, power up, and align a wireless interface system.

The invention also avoids the necessity of providing a connection to a local power source and of stringing cables through building roofs, walls, attics, ceilings, flooring, and the like. Installation can become simple enough for the user or subscriber to self-install the system. As a result, the installation of a wireless interface system and its subsequent operation utilizing the apparatus and methods of the present invention has a greater potential for market acceptance and commercial success.

In addition, utilization of the apparatus and methods described herein greatly simplifies rearranging equipment and moving equipment to a new location at the site, because the time and expense of relocating cabling, conduit, and wiring are eliminated. Also, additional units of equipment can be subsequently installed, and older equipment can be upgraded, with ease.

Although various items of equipment have been described herein as being on-site, the invention will also support equipment, which is near-site, such as mobile and hand-held equipment, which is within operational wireless range of wireless interface system 1.

While the invention has been described in terms of specific examples, it is evident that many alternatives and variations will be apparent to those skilled in the art based on the description herein, and it is intended to include such variations and alternatives in the claims.

What is claimed is:

1. A method for providing a self-aligning interface system between a wireless service and equipment communicating with the wireless service, the method comprising;

deploying the interface system;

the interface system determining when to begin self-alignment operations;

the interface system determining its geolocation;

the interface system determining its physical orientation;

the interface system orienting at least one antenna to a remote antenna on a remote communications node;

the interface system establishing a communications link with the remote communications node; and providing a cover over the interface system and allowing the cover to degrade through the action of environmental elements.

2. The method recited in claim 1, wherein the operation of determining when to begin self-alignment operations includes establishing a time base from a global positioning system.

3. The method recited in claim 1, wherein the interface system determines its geolocation from a position-determining network.

4. The method recited in claim 1, wherein the interface system orients the at least one antenna to the remote antenna by using a database of locations of remote communications nodes.

5. The method of claim 1, wherein deploying the interface system comprises:

delivering the interface system to a site in or near which the equipment is located and in such a physical orientation as to communicate with the wireless service via wireless signals.

6. The method of claim 1, wherein the at least one antenna is from the group consisting of a fixed antenna, a steerable antenna, and an omni-directional antenna.

7. A method of installing a wireless interface system as part of a commercial business which couples equipment to a wireless service, the method comprising:

delivering the wireless interface system to a site in or near which the equipment is located;

letting the wireless interface system set itself up to enable the equipment to wirelessly communicate with the wireless service through the wireless interface system; and providing a cover over the interface system and allowing the cover to degrade through the action of environmental elements.

8. The method of claim 7, wherein the site is a building, and wherein delivering includes:

placing the wireless interface system on the roof of the building in view of a remote communications node but without further alignment.

9. The method of claim 7, wherein the wireless service is from the group consisting of telecommunications, broadband communications, entertainment, television, radio, recorded music, movies, computer-based games, and the Internet.

10. The method of claim 7, wherein the equipment is from the group consisting of at least one telephone, at least one two-way radio, at least one television, at least one entertainment system, at least one computer, at least one sensor, and at least one actuator.

11. The method of claim 7, wherein the method also couples two or more items of equipment to each other.

12. An interface system providing an interface between a wireless service and equipment communicating with the wireless service, the interface system comprising:

least one antenna oriented to a communications node that provides access to the wireless service;

self-alignment equipment which enables the interface system to perform start-up operations prior to communicating with the wireless service;

a communications module coupled to the at least one antenna and to the self-alignment equipment, which communicates with the wireless service when the start-up operations have been performed by the self-alignment equipment; and a cover over the interface system, wherein the cover is degradable through the action of environmental elements.

13. The interface system of claim 12, wherein the self-alignment equipment comprises a geolocation module which determines the geolocation of the interface system.

14. The interface system of claim 12, wherein the self-alignment equipment comprises an orientation module which determines the physical orientation of the interface system.

15. The interface system of claim 12, wherein the self-alignment equipment comprises an antenna control module that orients the antenna to the communications node.

16. The interface system of claim 12, wherein the self-alignment equipment comprises a communications module which initiates operation of the self-alignment equipment.

17. The interface system of claim 12, wherein the at least one antenna is from the group consisting of a fixed antenna, a steerable antenna, and an omni-directional antenna.

18. The interface system of claim 12 and further comprising:

a power source that includes a solar cell array and a rechargeable battery.

* * * * *